(12) United States Patent
Ur

(10) Patent No.: US 6,615,046 B1
(45) Date of Patent: Sep. 2, 2003

(54) AUTOMATIC DISPATCH OF MOBILE SERVICES

(75) Inventor: Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/474,987

(22) Filed: Dec. 29, 1999

(51) Int. Cl.⁷ .............................................. H04Q 7/20
(52) U.S. Cl. ...................... 455/445; 455/422; 455/456; 455/459
(58) Field of Search ................................. 455/521, 445, 455/518–520, 456–457, 422, 426, 458, 459, 491; 379/219, 220.01

(56) References Cited

U.S. PATENT DOCUMENTS

| | | | |
|---|---|---|---|
| 3,867,577 A | 2/1975 | Herrington | 179/2 |
| 4,299,132 A | 11/1981 | Dellantonio | 74/10.33 |
| 4,360,875 A | 11/1982 | Behnke | 364/436 |
| 4,757,267 A * | 7/1988 | Riskin | 379/113 |
| 4,928,099 A | 5/1990 | Drake | 340/825 |
| 5,425,090 A | 6/1995 | Orriss | 379/201 |
| 5,428,546 A | 6/1995 | Shah et al. | 364/449 |
| 5,432,841 A | 7/1995 | Rimer | 379/59 |
| 5,532,702 A | 7/1996 | Mintz | 342/463 |
| 5,542,702 A | 8/1996 | Green et al. | 280/737 |
| 5,666,662 A | 9/1997 | Shibuya | 455/456 |
| 5,684,860 A * | 11/1997 | Milani et al. | 379/59 |
| 6,009,330 A * | 12/1999 | Kennedy, III et al. | 455/445 |
| 6,185,426 B1 * | 2/2001 | Alperovich et al. | 455/456 |

OTHER PUBLICATIONS

Logistics Computer Review, "PC*Miler for Windows—Version 10", by Colin Barrett, Editor, May 1996.
"Vehicle Tracking and Asset Location Systems".
Cell–Loc. Inc. Main Page, website.
Cellocate—Applications, webpage.
AVL—Automatic Vehicle Location International Inc., "Core Technologies".
"Field Tests of a Cellular Telephone Positioning System", R. Klukas et al., Cell–Loc Inc.

* cited by examiner

Primary Examiner—Lee Nguyen
Assistant Examiner—Tuan A Tran
(74) Attorney, Agent, or Firm—Darby & Darby

(57) ABSTRACT

A method for establishing a connection between a client and one of a plurality of mobile providers of a service, including maintaining a database comprising one or more variable parameters of each of the plurality of mobile providers of the service, and receiving a communication from the client requesting the service. The method further includes automatically selecting, responsive to the communication and to the parameters in the database, a suitable provider from among the plurality of mobile providers of the service, and routing the communication automatically so as to establish a direct connection between the selected provider and the client.

17 Claims, 2 Drawing Sheets

AUTOMATIC DISPATCH OF MOBILE SERVICES

FIELD OF THE INVENTION

The present invention relates generally to establishing a connection between a client and a provider of a service, and specifically to establishing a connection between a client of a service and one of a plurality of mobile service providers.

BACKGROUND OF THE INVENTION

Systems and methods for improving and optimizing a connection between a client and a provider of a mobile service, such as between a client needing a taxi and a taxi driver, are known in the art. In one of its simplest forms, a connection for a taxi is made by the client making a pre-arrangement with a specific taxi driver via a telephone call directly to the driver. This method presupposes that the client is aware of a time and place he/she needs to be picked up, has a telephone number of the taxi driver, and that the driver is available for the requested time. Where the above pre-arrangement method is not possible, a typical method for forming a connection is for the client to contact a dispatcher of a taxi-dispatching service, which dispatcher allocates a taxi to come to the client's location. Most preferably, the dispatcher chooses a taxi of the taxi-dispatching service which is already close to the client, to minimize time the client needs to wait.

U.S. Pat. No. 3,867,577 to Herrington, whose disclosure is incorporated herein by reference, describes apparatus for automatically dialing a central taxi dispatching station by transmitting a tape-recorded signal to a telephone line when an operator of the apparatus pushes a button. In addition to dialing the station, the apparatus provides means for two-way communication between the operator and the dispatching station.

U.S. Pat. No. 4,360,875 to Behnke, whose disclosure is incorporated herein by reference, describes a system for ridesharing. Drivers registered with the system transmit ride offers to a central station, which can also be contacted by members of the public, registered with the system, who require rides. The station attempts to match the ride offers and requests, and transmits the matching to appropriate drivers and riders.

U.S. Pat. No. 4,757,267 to Riskin, whose disclosure is incorporated herein by reference, describes a system for routing a telephone call from a customer seeking an item to a dealer supplying the item, whereby the dealer to whom the call is routed is geographically close to the customer. The number dialed by the customer includes digits identifying the item desired, and connects the customer to the system. The system determines the location of the customer from the customer's telephone number. The customer and the dealers are in fixed locations, served by a wired telephone network.

U.S. Pat. No. 4,928,099 to Drake, whose disclosure is incorporated herein by reference, describes a telemetry system for automated remote registration of services such as the dispatch of taxicabs. The system provides a plurality of geographically distributed custom-built call boxes which transmit requests to a central station. At the station the received requests are processed by a computer, which displays relevant requests to a dispatcher. The dispatcher contacts a service provider to supply the service, and the call box is informed that the service is being provided.

U.S. Pat. No. 5,428,546 to Shah et al., whose disclosure is incorporated herein by reference, describes a method and apparatus for tracking vehicle location. A location of a vehicle is shown on a display. In addition, the system utilizes one or more databases to present on the display additional information regarding the vehicle such as speed, heading, and proximity to streets and/or significant landmarks. The system is intended for use by managers or dispatchers of a fleet of vehicles.

U.S. Pat. No. 5,432,841 to Rimer et al., whose disclosure is incorporated herein by reference, describes a vehicle location system based on a cellular telephone "roaming" network. The system utilizes existing signals transmitted from cell stations within the network, which signals register telephones within a cell. The system is able to use the registration signals to locate geographically telephones within the vehicles.

U.S. Pat. No. 5,532,702 to Mintz, whose disclosure is incorporated herein by reference, describes a method and system for obtaining information from a plurality of remote stations. Each of the remote stations transmits a signal indicative of a characteristic of the station. In one example, the remote stations comprise a plurality of taxis which each transmit an identifying signal. A customer telephones for a taxi, and the system uses the identifying signals to locate the taxi geographically closest to the customer.

U.S. Pat. No. 5,666,662 to Shibuya, whose disclosure is incorporated herein by reference, describes a method for detecting the location of a mobile terminal in a cellular telephone network. At least three base stations receive a location signal from the mobile terminal, transmitted in response to an inquiry signal transmitted by a base station in the network. The location of the mobile terminal is determined by finding the distances from the terminal to the at least three base stations, based on the strength of the received location signal at the at least three stations.

SUMMARY OF THE INVENTION

It is an object of some aspects of the present invention to provide improved methods and apparatus for establishing a connection between a customer and a mobile provider of a service.

In preferred embodiments of the present invention, a plurality of mobile transceivers operate within a cellular telephone network. The transceivers are preferably installed in service-supply-vehicles such as taxicabs or delivery trucks. The position of each of the mobile transceivers is tracked automatically by a central control unit, using any suitable location system known in the art, most preferably a system that uses signals generated by the cellular telephone network in the course of network operation. The positions, and other parameters relevant to the service being provided, such as idle time of each taxicab, are stored in a database maintained by the central control unit.

A customer desiring service from one of the service-supply-vehicles dials a number corresponding to the service required. The call is received by the central control unit, which determines the general location of the customer based on the location of the telephone from which the call is made. The central control unit uses the database to automatically choose a most-suitable-provider to supply the service. The most-suitable-provider is chosen using database parameters relevant to the service being provided, such as distances between respective vehicles and the customer, direction of travel of respective vehicles, and vehicle idle time. The call is routed by the central control unit to the most-suitable-provider, so that a direct connection between the customer and the most-suitable-provider is automatically established.

After the direct connection has been established, the customer and the most-suitable-provider are able to communicate in order to arrange further details of the service to be provided. For example, in the case of a taxi service, the customer can provide her exact address, and the driver can give an estimated time of arrival at the address. Effecting an automatic direct connection between a customer and the most-suitable-provider of a plurality of mobile service providers is an efficient way of providing the service, not at present known in the art.

In some preferred embodiments of the present invention, operators of the mobile transceivers indicate to the central control unit whether or not the operator's vehicle (or other service) is available. If the vehicle is a taxicab, for example, the operator indicates that he is unavailable if he has already picked up a fare or is otherwise occupied. Such indication may be effected automatically, for example, when the taxi driver turns his meter on.

In some preferred embodiments of the present invention, the most-suitable-provider is able to transfer the connection effected by the central control unit to a second transceiver used by a second provider of the requested service. Preferably, the transfer is effected before the direct connection is made between the most-suitable-provider and the customer. Most preferably, the central control unit automatically queries the most-suitable-provider as to his willingness to provide the service, and connects the customer to the provider only after the provider has answered in the affirmative. Alternatively, the transfer is effected after the direct connection has been made between the most-suitable-provider and the customer. Most preferably, the second transceiver is chosen by the central control unit on substantially the same basis as the most-suitable-provider is chosen.

There is therefore provided, in accordance with a preferred embodiment of the present invention, a method for establishing a connection between a client and one of a plurality of mobile providers of a service, including:

maintaining a database including one or more variable parameters of each of the plurality of mobile providers of the service;

receiving a communication from the client requesting the service;

automatically selecting, responsive to the communication and to the parameters in the database, a suitable provider from among the plurality of mobile providers of the service; and routing the communication automatically so as to establish a direct connection between the selected provider and the client.

Preferably, maintaining the database includes maintaining a location of each of the plurality of mobile providers, and receiving the communication from the client includes determining a location of the client responsive to the communication, and selecting the suitable provider includes evaluating respective distances between the location of the client and the locations of at least some of the plurality of mobile providers.

Preferably, maintaining the location of each of the plurality of mobile providers includes evaluating each location based on transmissions from respective transceivers operated by the plurality of mobile providers.

Preferably, the transceivers include cellular transceivers, and routing the communication includes routing communications via a cellular network.

Preferably, selecting the suitable provider includes prioritizing a plurality of suitable providers, and routing the communication includes establishing the communication between the client and the suitable provider with a highest priority.

Preferably, selecting the suitable provider includes transferring the communication to one of the suitable providers with a priority less than the highest priority when the provider with the highest priority is unavailable.

Preferably, the method includes appointing one of the providers as a system overseer, wherein routing the communication includes transferring the communication to the system overseer when automatic selection of the suitable provider is unsuccessful.

Preferably, maintaining the database includes obtaining at least some of the one or more variable parameters by evaluating transmissions of a mobile communications network.

Preferably, obtaining the parameters by evaluating the transmissions includes purchasing information from an operator of the mobile communications network.

Preferably, routing the communication includes routing a call through the mobile communications network in return for a portion of a fee paid by the client to the selected provider.

Preferably, the mobile communications network includes a cellular telephone network.

There is further provided, in accordance with a preferred embodiment of the present invention, apparatus for establishing a connection between a client and one of a plurality of mobile providers of a service, including:

a data storage unit, adapted to maintain a database including one or more parameters of each of the plurality of mobile providers of the service; and a central control unit, adapted to receive a communication from the client requesting the service and to determine, responsive to the communication and to the one or more parameters in the database, a suitable provider from among the plurality of mobile providers of the service, and to route the communication automatically so as to establish a direct connection between the suitable provider and the client.

Preferably, the apparatus includes a respective plurality of mobile transceivers which are adapted to communicate between the plurality of mobile providers and the central control unit.

Preferably, each of the plurality of mobile transceivers includes a control for invoking a transfer function, which routes the communication to another mobile transceiver.

Preferably, the mobile transceivers include cellular transceiver units.

Preferably, the one or more parameters include a location of each of the plurality of mobile providers, and the central control unit is adapted to determine a location of the client from the communication and to evaluate respective distances between the location of the client and the locations of at least some of the plurality of mobile providers.

Preferably, the central control unit is adapted to determine the locations of the client and of the plurality of mobile providers based on data obtained from a cellular communications network.

The present invention will be more fully understood from the following detailed description of the preferred embodiments thereof, taken together with the drawings, in which:

DETAILED DESCRIPTION OF PREFERRED EMBODIMENTS

Figure 1:
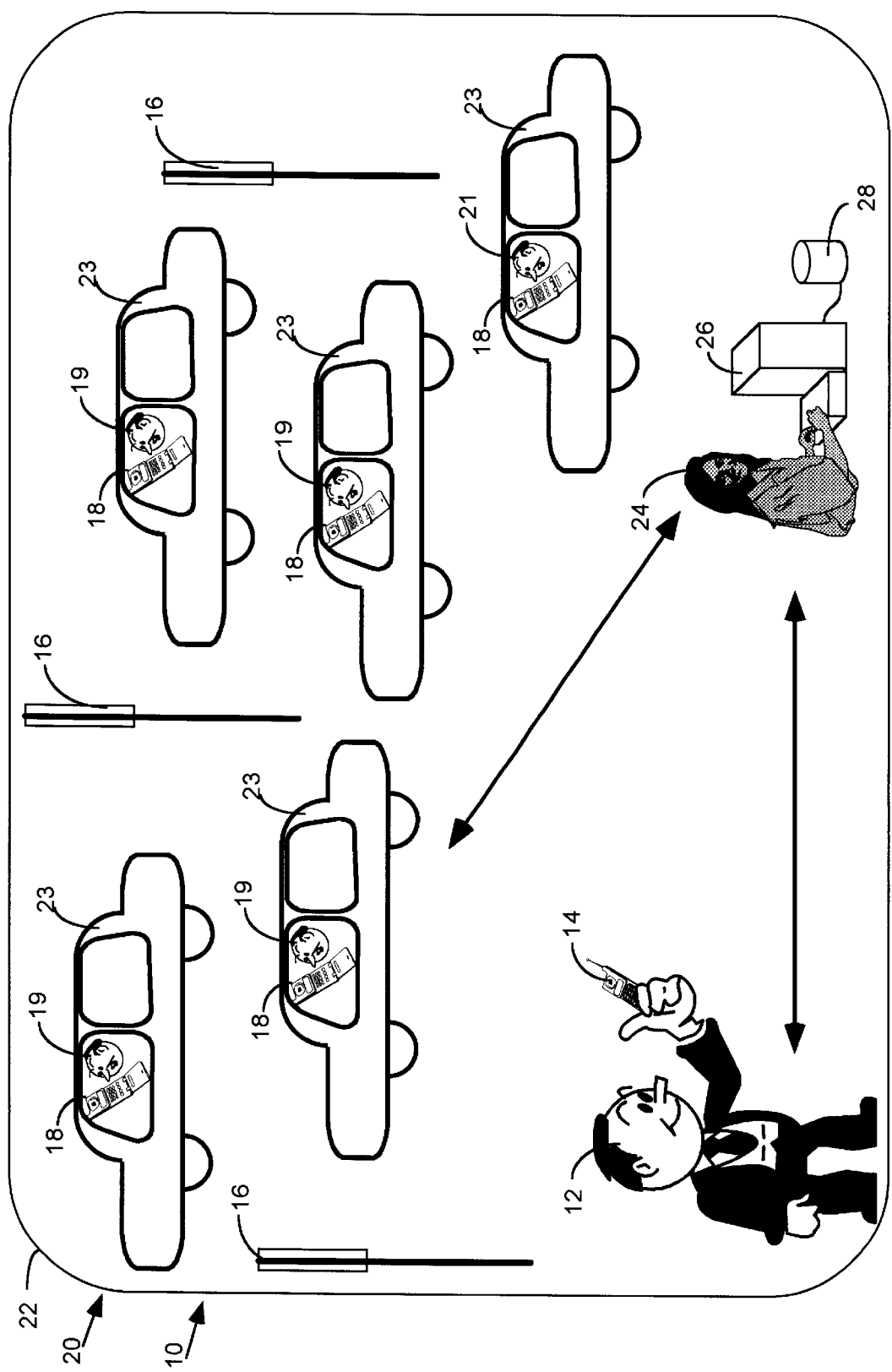
FIG. 1 is a schematic diagram of an automatic dispatch system, according to a preferred embodiment of the present invention.

Reference is now made to FIG. 1, which is a schematic diagram of an automatic dispatch system 10, according to a preferred embodiment of the present invention. A plurality of mobile transceivers 18 are operated by a respective plurality of service providers 19. Mobile transceivers 18 are most preferably industry-standard transceivers operated within a cellular telephone network 20 in a region 22. Each transceiver 18 is preferably installed in a respective vehicle 23 which provides a service, for example a taxi service. Mobile transceivers 18 are in communication with one or more of a plurality of Base Transceiver Stations (BTSs) 16 of network 20.

Most preferably, a respective location of each of transceivers 18 is determined from the communications between each of the transceivers and the one or more BTSs, by a method known in the art. Alternatively, the location of each transceiver 18 is determined by another system known in the art, such as each vehicle having a Global Positioning System (GPS) device installed within the vehicle. The location of each of transceivers 18 is maintained in a database 28 stored by a central control unit (CCU) 26 acting as a data storage unit. Optionally, database 28 also maintains other parameters relevant to delivery of the service in region 22, such as traffic density on roads in the region and idle time of vehicles supplying the service. CCU 26 is initially set up by a system operator 24, but after initial setup there is generally no need for intervention of the operator in system 10.

A client 12 contacts the service by contacting CCU 26, preferably using a mobile transceiver 14 operating within network 20. Most preferably, client 12 contacts the service by dialing a service number known to the client, for example 1-800-GET-TAXI. Alternatively, client 12 contacts the service using a telephone operating on a wired network, such as a public switched telephone network. If mobile transceiver 14 is used by client 12, a location of the transceiver is determined in a substantially similar manner to the method used for determining the locations of mobile transceivers 18 using communications with BTSs 16. If client 12 uses a telephone operating on a wired network, the location of the telephone is determined by methods known in the art, typically based on the telephone number.

On receipt of the contact from client 12, CCU 26 uses the locations of transceivers 18 in database 28 and the determined location of the client to evaluate which of the plurality of providers 19 is most appropriate for supplying the service to the client. The evaluation is most preferably made by finding from location parameters in database 28 which provider 19 is geographically closest to client 12. Alternatively or additionally, the evaluation comprises using other parameters in database 28, such as parameters indicating the idle time of each provider 19. The most appropriate provider 19 as determined by the evaluation is assigned a priority 1, and is herein termed the most-suitable-provider. In addition to determining the most-suitable-provider, CCU 26 determines from the plurality of providers 19 a plurality of other appropriate providers of the service, herein termed suitable-providers. The suitable-providers are assigned priorities 2, 3, . . . , which priorities are allocated by CCU 26 according to variables, such as distance to client 12 and idle time of each suitable-provider, determined from database 28. Most preferably, CCU 26 finds the plurality of suitable-providers by substantially the same method as used for finding the most-suitable-provider.

In preferred embodiments of the present invention, transceivers 18 have one or more functions specific to the service incorporated within each transceiver. Most preferably, the functions are incorporated within transceivers 18 via one or more programs installed within each transceiver by central operator 24, by methods known in the art. Preferably, the functions installed within transceivers 18 comprise an unavailable function by which a specific provider 19 indicates to CCU 26 that he/she is not able to provide the service. Preferably, the functions further comprise a transfer function, by which the user of one of the transceivers transfers a connection that he has received to another transceiver.

Transceiver 18 operated by the most-suitable-provider is connected by CCU 26 directly with transceiver 14, so that direct communication between client 12 and the most-suitable-provider is established. Most preferably, once direct communication has been established, client 12 and the most-suitable-provider exchange information, such as a more exact location of client 12 and an estimated time before the most-suitable-provider can provide the service to the client. If the most-suitable-provider is unavailable for performing the service, the unavailable function of transceiver 18 of the most-suitable-provider is activated. In this case, CCU 26 routes the connection from client 12 to one of the suitable-providers so that direct communication between the client and the one of the suitable-providers is established.

Once direct communication has been established between client 12 and a specific provider 19 (the most-suitable-provider or one of the suitable-providers), the specific provider is able to transfer the connection to another provider 19 using the transfer function. For example, if direct communication has been established between client 12 and the most-suitable-provider, but during the course of the direct communication the most-suitable-provider finds he is unable to provide the service, the most-suitable-provider activates his transfer function, so that the connection is transferred to one of the other suitable-providers.

In some preferred embodiments of the present invention, system 10 comprises a system overseer 21 who is able to function as a service contact for client 12. Preferably, system overseer 21 is one of providers 19, for example, one of providers 19 who is not actively providing the service, such as a provider who is waiting in a taxi rank. Alternatively, system overseer 21 is another person such as system operator 24. A call from client 12 can be transferred to system overseer 21 by one of providers 19 using the transfer function on their respective transceiver 18. For example, a call from client 12 requesting an advanced booking, or wherein no suitable-providers are available, is transferred to system overseer 21.

Figure 2:
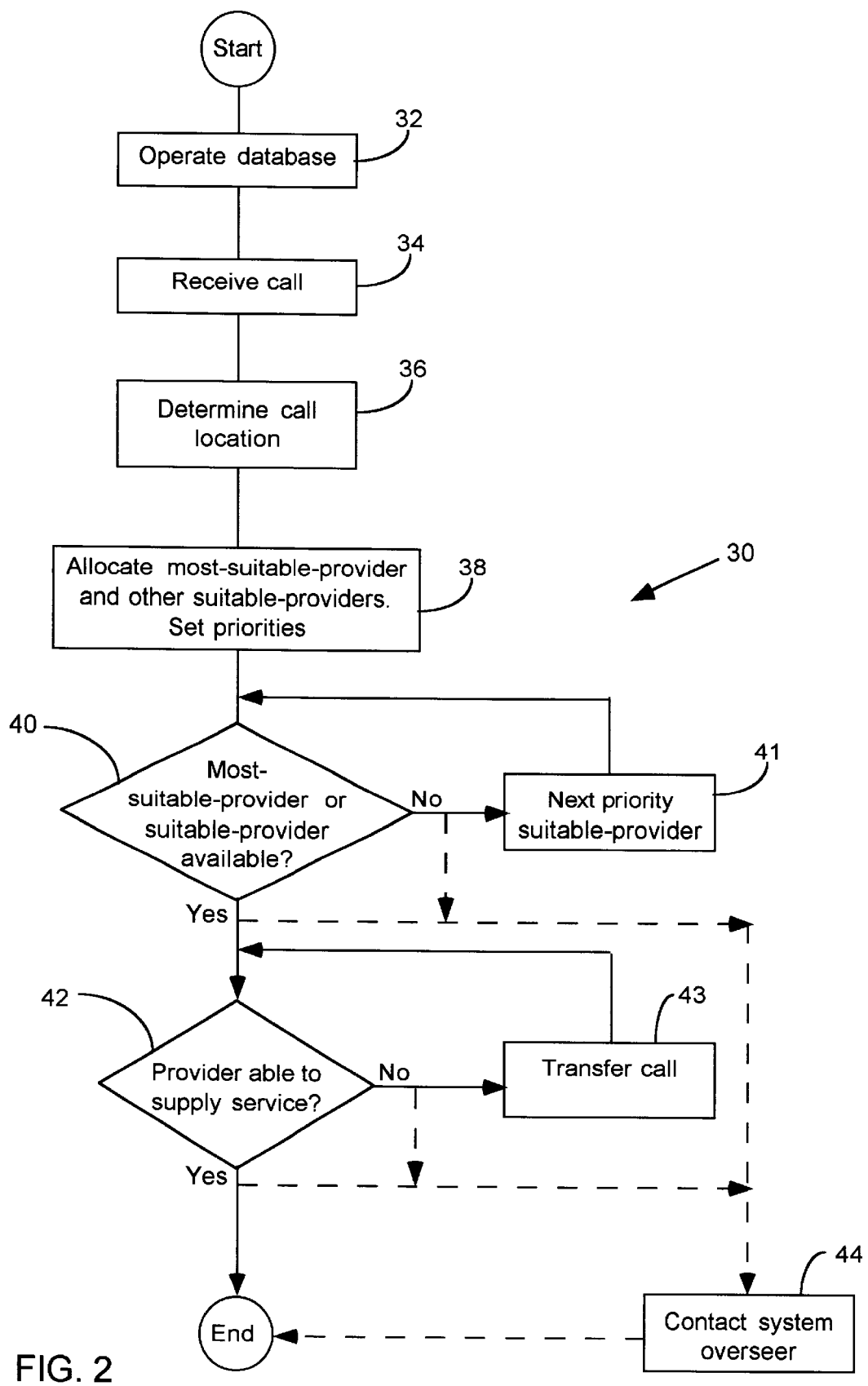
FIG. 2 is a flowchart showing steps involved in a connection setup process of an automatic dispatch system, according to a preferred embodiment of the present invention.

FIG. 2 is a flowchart showing steps involved in a connection setup process 30, according to a preferred embodiment of the present invention. In a database operation step 32, database 28, comprising parameters of providers 19 as described above, is set up and maintained by CCU 26. In a receive call step 34, CCU 26 receives a call for service from client 12. In a location step 36, CCU determines the location of client 12, as described above. In a provider allocation step 38, CCU 26 uses the location of client 12, and the locations and other parameters of providers 19 stored in database 28, to automatically determine and prioritize the most-suitable-provider and the plurality of suitable-providers.

In a first connect call step 40, CCU 26 routes the call from client 12 to one of providers 19. If the most-suitable-provider is available, i.e., the unavailable function of transceiver 18 of the most-suitable-provider has not been activated, the call is routed to the most-suitable-provider. If the unavailable function has been activated, the call is routed to the suitable-provider having priority 2, at a next provider step 41. This process continues until one of providers 19 is found to be available.

In a second connect call step 42, the provider found to be available in steps 40 is directly and automatically connected to client 12. After connection, the provider and the client communicate in order to finalize details of the service to be provided, for example the exact address of the client and an estimate of the cost of the service. If during the communication the provider found to be available determines he is unable to provide client 12 with the required service, the provider is able to activate the transfer function on his transceiver 18. Activating the transfer function, at a transfer step 43, preferably transfers the communication automatically to a next most suitable-provider having appropriate priority, who is then able to finalize service details with client 12 as described above. Alternatively, the first provider found to be available is able to choose to whom the transfer is made.

When system 10 comprises system overseer 21, the most-suitable-provider and/or one of the suitable-providers may use the transfer function on their respective transceiver to route the connection from client 12 to the system overseer, in a contact overseer step 44. This action is appropriate, for example, if client 12 requests that the service be provided at some future time. Connections to step 44 are illustrated in FIG. 2 by broken lines.

System 10 may be operated in accordance with a variety of different business models. For example, in one preferred embodiment of the present invention, resembling the manner in which some taxi stations operate at present, CCU 26 and transceivers 18 are owned and operated by a dedicated taxi dispatching service. The service obtains information, either gratis or for a fee, from an operator of cellular telephone network 20 as to the locations of transceivers 14 and 18. In another preferred embodiment, system 10 is operated by the cellular network operator, as an added-value service to mobile subscribers. In this case, the cellular network operator might distribute transceivers 18 to providers 19 free of charge, in the expectation of profiting, for example, from air time used by clients in calling the service, and possibly by a surcharge on the taxi fares. Variations on these models will be apparent to those skilled in the art.

Although preferred embodiments are described herein with particular reference to taxi service, it will be understood that the principles of the present invention may likewise be applied to all sorts of other mobile services, such as messenger and parcel delivery services, police and security services, and vehicle breakdown services. It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for establishing a connection between a client and one of a plurality of mobile providers of a service, comprising:

maintaining in a service central control unit a database comprising one or more variable parameters of each of the plurality of mobile providers of the service;

establishing a one-way connection from the client to the service central control unit;

receiving a communication from the client to the service central control unit via the one-way connection requesting the service;

automatically selecting, responsive to the communication and to the parameters in the database, a suitable provider from among the plurality of mobile providers of the service; and routing the communication automatically so as to establish a direct connection between the selected provider and the client.

2. A method according to claim 1, wherein maintaining the database comprises maintaining a location of each of the plurality of mobile providers, and wherein receiving the communication from the client comprises determining a location of the client responsive to the communication, and wherein selecting the suitable provider comprises evaluating respective distances between the location of the client and the locations of at least some of the plurality of mobile providers.

3. A method according to claim 2, wherein maintaining the location of each of the plurality of mobile providers comprises evaluating each location based on transmissions from respective transceivers operated by the plurality of mobile providers.

4. A method according to claim 3, wherein the transceivers comprise cellular transceivers, and wherein routing the communication comprises routing communications via a cellular network.

5. A method according to claim 1, wherein selecting the suitable provider comprises prioritizing a plurality of suitable providers, and wherein routing the communication comprises establishing the communication between the client and the suitable provider with a highest priority.

6. A method according to claim 5, wherein selecting the suitable provider comprises transferring the communication to one of the suitable providers with a priority less than the highest priority when the provider with the highest priority is unavailable.

7. A method according to claim 1, and comprising appointing one of the providers as a system overseer, wherein routing the communication comprises transferring the communication to the system overseer when automatic selection of the suitable provider is unsuccessful.

8. A method according to claim 1, wherein maintaining the database comprises obtaining at least some of the one or more variable parameters by evaluating transmissions of a mobile communications network.

9. A method according to claim 8, wherein obtaining the parameters by evaluating the transmissions comprises purchasing information from an operator of the mobile communications network.

10. A method according to claim 8, wherein routing the communication comprises routing a call through the mobile communications network in return for a portion of a fee paid by the client to the selected provider.

11. A method according to claim 8, wherein the mobile communications network comprises a cellular telephone network.

12. Apparatus for establishing a connection between a client and one of a plurality of mobile providers of a service, comprising:

a data storage unit, adapted to maintain a database comprising one or more parameters of each of the plurality of mobile providers of the service; and a central control unit, adapted to establish a one-way connection from the client and to receive a communication from the client via the one-way connection requesting the service and to determine, responsive to the communication and to the one or more parameters in the database, a suitable provider from among the plurality of mobile providers of the service, and to route the communication automatically so as to establish a direct connection between the suitable provider and the client.

13. Apparatus according to claim 12, and comprising a respective plurality of mobile transceivers which are adapted to communicate between the plurality of mobile providers and the central control unit.

14. Apparatus according to claim 13, wherein each of the plurality of mobile transceivers comprises a control for invoking a transfer function, which routes the communication to another mobile transceiver.

15. Apparatus according to claim 13, wherein the mobile transceivers comprise cellular transceiver units.

16. Apparatus according to claim 12, wherein the one or more parameters comprise a location of each of the plurality of mobile providers, and wherein the central control unit is adapted to determine a location of the client from the communication and to evaluate respective distances between the location of the client and the locations of at least some of the plurality of mobile providers.

17. Apparatus according to claim 16, wherein the central control unit is adapted to determine the locations of the client and of the plurality of mobile providers based on data obtained from a cellular communications network.

* * * * *